United States Patent [19]

Lees

[11] Patent Number: 4,497,345

[45] Date of Patent: Feb. 5, 1985

[54] FLOW CONVERSION DEVICE AND METHOD

[76] Inventor: Jeremy J. Lees, 124 Louisa Rd., Birchgrove, NSW, Australia, 2041

[21] Appl. No.: 397,772

[22] Filed: Jul. 13, 1982

[30] Foreign Application Priority Data

Nov. 4, 1981 [AU] Australia ........................ PF1420/81

[51] Int. Cl.[3] ........................ F15D 1/14; B65G 53/04

[52] U.S. Cl. ........................................ 138/39; 138/37; 406/181

[58] Field of Search ............................ 138/37, 39, 40; 137/599; 406/1, 181, 191, 195, 197, 198

[56] References Cited

U.S. PATENT DOCUMENTS

| | | | |
|---|---|---|---|
| 3,572,391 | 3/1971 | Hirsch | 138/37 X |
| 3,652,131 | 3/1972 | Carlsson | 406/181 |
| 3,842,678 | 10/1974 | De Baun et al. | 138/37 X |
| 4,027,920 | 6/1977 | Wennerstrom | 406/181 |

*Primary Examiner*—James E. Bryant, III

*Attorney, Agent, or Firm*—Holman & Stern

[57] ABSTRACT

A device for converting a stream of a slurry or liquid flowing down a tube into a flat stream having a uniform flow across its width and, if a slurry, a uniform particle size distribution across that width. The device comprises a vertical tube from which the slurry or liquid may flow onto a horizontal first plate in an even laminar flow and a second plate adapted to receive medium flowing over the edge of the first plate disposed below the first plate and inclined relative thereto. Metering of the amount of medium flowing onto any one increment of the width of the second plate so that it will be substantially equal to the amount of medium flowing down any other increment of equal width is achieved by the use of a first plate having a closely defined peripheral shape or by the use of vertical dividing members spaced around the periphery at uniform angular spacings which direct the medium onto equal width increments of the second plate.

6 Claims, 5 Drawing Figures

FIG. 4
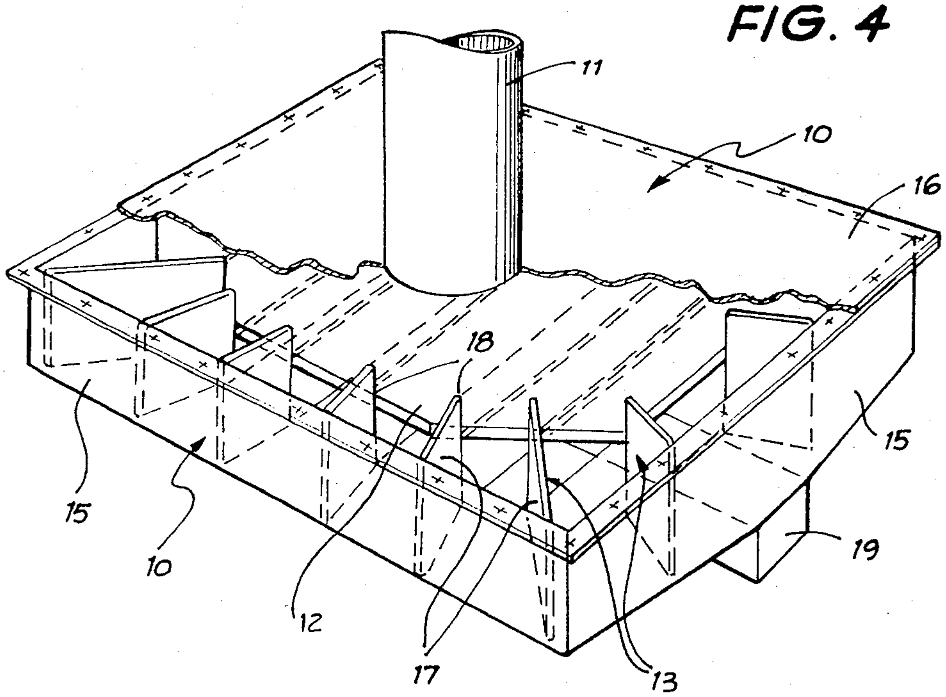
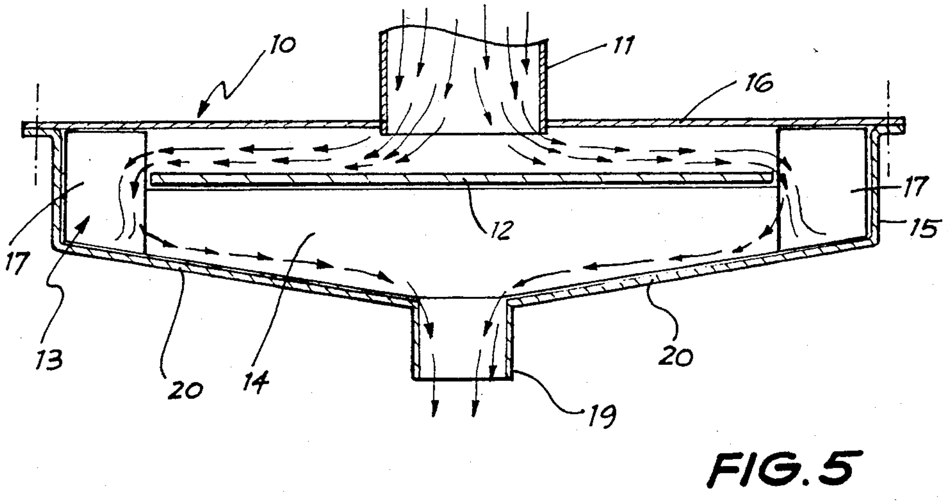
FIG. 5

FLOW CONVERSION DEVICE AND METHOD

BACKGROUND OF THE INVENTION

1. Field of the Invention

The present invention relates to a device for converting at least part of a stream of a flowable medium flowing down a tube into a flat stream having a substantially uniform flow across its width.

2. Description of the Prior Art

There are many instances in mining and other industries in which it would be desirable to spread a stream of a flowable medium in a tube out into a flat stream having a uniform flow across its width. Such instances include those where it is desired to feed processing equipment with a flat stream of flowable medium or where it is desired to separate a stream accurately into a plurality of parts. The latter situation particularly arises when it is desired to take samples from a stream of a flowable medium and it is necessary to know what proportion of the total stream has been drawn off into the sample. The difficulty of achieving the conversion of a tubular flow to a flat planar flow is increased where the flowable material is a slurry or other dispersion of solid particles in a fluid in which case it is desirable to obtain not only a uniform flow across the width of the stream but also a uniform particle density and particle size distribution across the width of the stream.

The present invention is designed to provide a device and a method for achieving such a conversion of the flow pattern of a stream of a flowable medium.

BRIEF SUMMARY OF THE INVENTION

The present invention consists in a device for converting at least a part of a stream of a flowable medium flowing down a tube into a flat stream having a substantially uniform flow across its width, comprising a substantially vertical tube down which the medium can flow; a first, substantially horizontal, plate disposed below the tube; a second plate inclined relative to the first plate and adapted to receive medium flowing over the edge of at least a portion of the first plate; and means to meter the amount of medium flowing onto any one increment of the width of the second plate so that it will be, after flowing down the second plate a predetermined distance, substantially equal to the amount of medium flowing down any other increment of equal width.

The present invention further consists in a method for converting at least a part of a stream of a flowable medium flowing down a tube into a flat stream having a substantially uniform flow across its width, comprising the steps of flowing the stream of the flowable medium down a substantially vertical tube onto a substantially horizontal first plate, flowing the flowable medium over at least a portion of the edge of the first plate onto a second plate inclined relative to the first plate, and providing means to meter the flow of the flowable medium over the said portion of the edge of the first plate such that the amount of medium flowing onto any one increment of the width of the second plate is such that it will be, after flowing down the second plate a predetermined distance, substantially equal to the amount of medium flowing down any other increment of equal width.

The device and method according to the present invention are of particular applicability in handling slurries or dispersions of solid or liquid particles in a liquid. The invention is, however, also of use in the handling of streams of pure liquids, of flowable streams of solid particles, or of streams of dispersions of solid or liquid particles in appropriate gas streams.

The stream of flowable medium should be flowed down a vertical tube, preferably of circular cross sectional shape, for a distance sufficient to achieve a uniform distribution of any particles in the medium over the cross sectional area of the tube. If need be stream straightening vanes or like means may be included in the tube.

The stream is flowed onto a horizontal plate smoothly and without turbulence by virtue of the tube lying with its longitudinal axis normal to the plane of the first plate. The stream spreads out evenly from the tube across the plate until it comes to the edge of the plate. At least a portion of this edge is positioned above the second plate such that the stream flowing over the edge lands on the second plate and flows down it.

There are two separate methods of metering the stream of medium flowing over the edge of the first plate onto the second plate.

The first method consists in accurately shaping the first plate at least over the portion from which the stream will fall onto the second plate to achieve the desired result. In this embodiment of the invention the edge of at least the said portion of the plate should lie along a line defined by the formula:

$$Y = + \text{ and } - \left(\frac{A}{\text{Tan } A}\right) \times \left(\frac{W}{\pi}\right)$$

where $A = (X\pi/W)$ in radians, where W = the notional width of the second plate, where X = the distance measured along a coordinate orthogonal to the fall line of the second plate and which has its origin at the point at which the vertical axis of the tube would, if extended, meet the first plate, and where Y = the distance measured along a coordinate parallel to the fall line of the second plate, which coordinate shares a common origin with the x coordinate.

In most instances using this embodiment of the invention the complete edge of the first plate will fall along the line so defined. A single second plate can then collect the total stream from the first plate. Alternatively a pair of second plates can be used, each one of which collects the stream falling over the edge of a half of the first plate lying on one side of the said coordinate. In a still further embodiment only a small portion of the edge of the first plate lies along the above defined line and the second plate only collects the stream of flowable medium flowing over this small portion of the edge.

The second method of metering the stream of medium flowing over the edge of the first plate onto the second plate is to position on the plate or about the edge of the plate a plurality of dividing members each of which extends transversely to the plane of the first plate. The leading edge, of each dividing member, i.e. the edge which is proximial to the tube, serves to divide the stream flowing over the edge into a number of parts. The dividing members are preferably so arranged that the angle measured at the origin of the first plate between adjacent vertical edges of at least a majority of the dividing members is equal. Adjacent dividing members serve to direct the stream flowing between them onto an increment of the width of the second plate such that the ratio of the angle subtended between each pair of adjacent dividing members at the origin of the first plate to the width of the increment of the second plate to which the stream flowing between these adjacent dividing members is directed substantially constant.

The said vertical edges may lie along a locus as defined above, however, this is not essential to the invention as the same effect can be achieved provided that the angle subtended at the origin of the plate by each pair of adjacent edges is equal and the width of the second plate to which each part of the stream is directed is equal and the ratio referred to above is otherwise maintained constant.

The dividing member may extend downwardly (vertically or at an angle thereto) until it meets the second plate or they may stop short of the second plate and allow the flowable medium to fall vertically onto it. In the former case the second plate, at least in the upper reaches will be divided into a number of channels. If the base of each of these channels, as seen in vertical section, is horizontal, the flowable medium will spread out evenly across the channel even if it is originally directed to one side of the channel by one of the dividing members.

This latter approach to the metering of the stream of medium has the advantage that in large installations, such as coal washeries, it is easier to accurately position the edges of a number of vertical dividing members than to cut the first plate exactly to the locus defined above. A further advantage lies in that the actual width of the first plate may be reduced as compared with the first method described above. This is because the part of the first plate extending beyond the dividing members furthest from the tube may be dispersed with. This arrangement has a further advantage that minor fluctuations in flow rate will not cause fluctuations in the amount of flowable medium which reaches the lateral extremities of the second plate.

The second method for metering the flow of the flowable stream does have the disadvantage, however, that a greater length of second plate must be allowed for the flow to spread out evenly than is required with the first method. This length is dependent upon the number of dividing members; the more dividing members there are the more accurately will the stream be metered and therefore the less distance will be required for each subdivided increment of the flow to even itself out across the zone of the second plate upon which it falls. It should also be noted that if the dividing members are spaced outwardly from the first plate the distance between the actual edge of the first plate and the locus defined above should not be greater than can be spanned by the laminar flow of the stream as it leaves the edge of the first plate. Thus the maximum gap between the actual edge and the ideal edge will depend upon the flow rate of the medium across the plate.

The second plate need not be planar but it must have a linear fall line, i.e., the angle of fall may change along the length of the plate but the direction of fall must remain constant. Put another way, the angle of fall measured at any point along a line extending across the width of the second plate must be constant. The average angle of fall of the second plate relative to the first is preferably from 5° to 25°, but may be greater.

Those parts of the device which are most susceptible to wear, such as the vertical edges of the dividing members and an area of the first plate directly beneath the tube, are preferably formed of an abrasion resistant material such as "Nihard". The remainder of the device may be formed of any suitable material such as mild steel. It is preferred that an epoxy or polyurethane coating be applied to the steel, at least in those parts susceptible to wear.

The vertical edges of the dividing members are preferably formed with an axially extending bead which is circular in cross section.

If the metering of the stream is brought about by flowing it over a first plate, the peripheral edge of which is defined by the formula given above, it may be advantageous to flow the stream passing over the edge of the first plate onto one or more of intermediate plates prior to flowing it onto the second plate. This can be advantageous in that it may serve to avoid inaccuracies caused by flow anomolies when the fluid flow hits the second plate if each of the intermediate plates has an appropriate complex shape.

BRIEF DESCRIPTION OF THE DRAWINGS

Hereinafter given by way of example only is a preferred embodiment of a device according to the present invention described with reference to the accompanying drawings wherein;

FIG. 4 is a partly cut away perspective view of the device shown in FIG. 1, and FIG. 5 is a cross sectional view taken along line V—V in FIG. 1.

DETAILED DESCRIPTION

Figure 1:
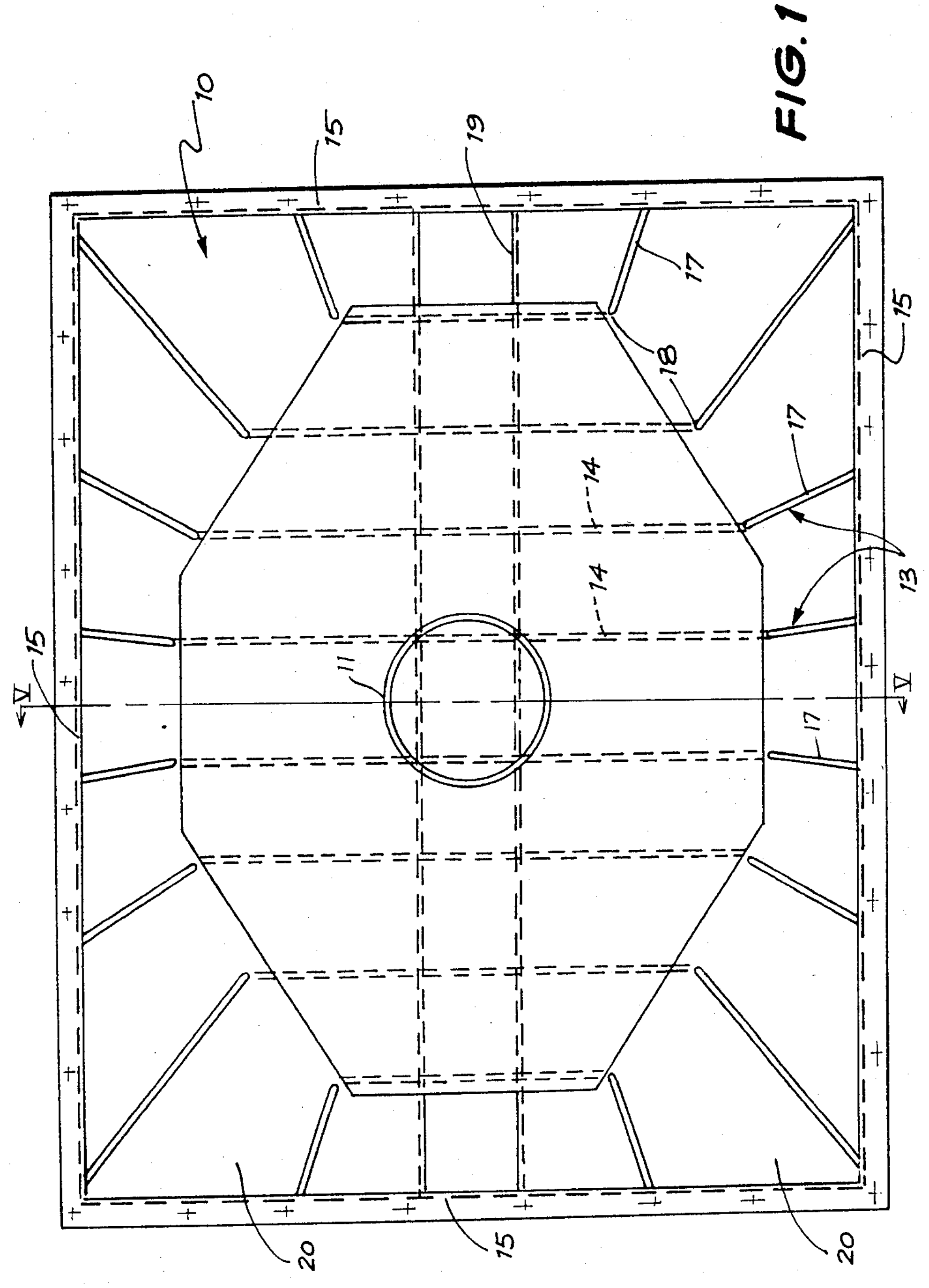
FIG. 1 shows a top plan view of a device according to the present invention, with the top lid omitted for clarity.
Figure 2:
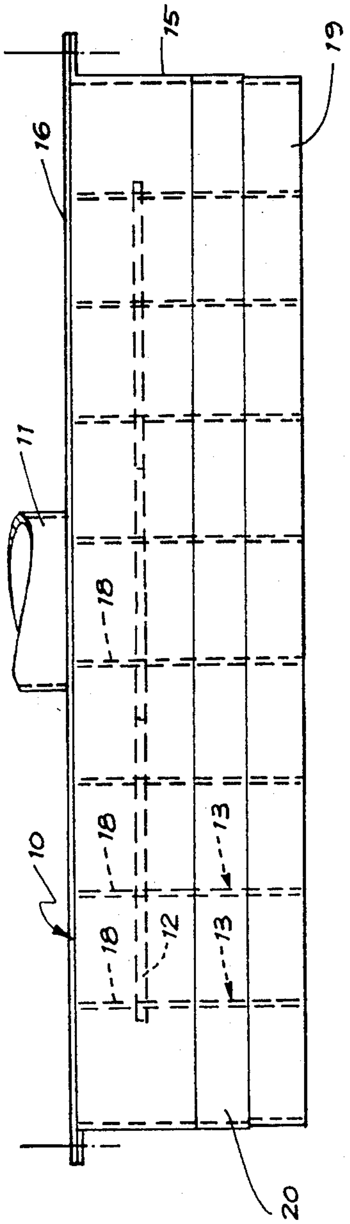
FIG. 2 shows a front elevational view of the device shown in FIG. 1.
Figure 3:
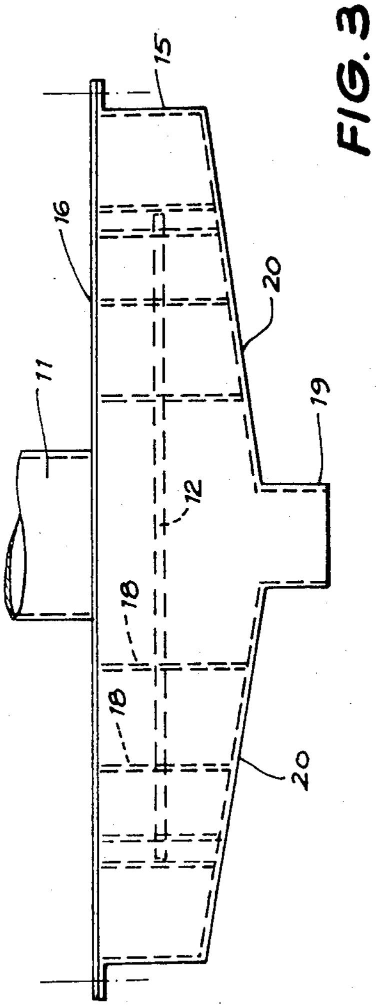
FIG. 3 shows a side elevational view of the device shown in FIG. 1.

The device 10 is designed to convert a cylindrical flow of a slurry of coal particles in water into two substantially flat streams each being of substantially constant flow rate across its width and each containing across its width a uniform distribution of coal particles. The flat streams are adapted to form the feed stream for a seive bend or a pair of seive bends which sieve out fines from larger lumps of coal.

The device 10 includes a vertical tube 11 which is positioned above, and separated slightly from a horizontal flat plate 12. The plate 12 is supported by an array of dividing members 13 disposed on a pair of converging planar plates 20 and surrounded by four side walls 15 and a lid 16.

Each dividing member 13 includes an intermediate portion 14 having a horizontal upper edge on which the plate 12 rests. The intermediate portions 14 of the dividing members 13 are arranged in equidistant spaced apart parallel array. On either side of the intermediate portion 14 of each dividing member 13 is a vertical side portion 17 lying in a plane inclined to the plane of the intermediate portion 14 to which it is attached such that each side portion 17 lies in a direction radial to the longitudinal axis of the tube 11. Each side portion 17 rises above the level of the plate 12 and has a vertical edge 18 directed towards the tube 11 positioned slightly away from the edge of the plate 12.

The vertical edges 18 all lie on an imaginary line defined by the formula:

$$Y = + \text{ and } - \left(\frac{A}{\operatorname{Tan} X}\right) \times \left(\frac{W}{\pi}\right)$$

where $A = (X\pi)/W$ in radians, where W = the notional width of the plate 12 and in fact in this case is the width of each of the plates 20, where X = the distance along the axis of symmetry of the plate 12, which is at right angles to the fall line of each of the plates 20, from the point at which the longitudinal axis of the tube meets the said axis of symmetry of the plate 12, and where Y = is the distance along the axis of symmetry of the plate 12 which lies parallel to the fall lines of the plates 20.

The dividing members are so spaced apart that adjacent vertical edges 18 subtend an angle of 20° at the longitudinal axis of the tube 11. Each of the vertical edges 18 is so spaced from the said axis of symmetry that the angle therebetween subtended at the axis of the tube 11 is also 20°.

In use slurry is flowed down tube 11 onto plate 12. The slurry stream spreads out across the plate 12 and falls over the edges thereof onto one or other of the sloping plates 20. The vertical edges 18 divide the flow such that equal quantities of the stream fall between each pair of adjacent dividing members 13 on each side of the long axis of symmetry of the plate 12. As each increment of slurry stream flows down one of the plates 20 the stream will tend to flatten out such that when the flow reaches the lower edge of plate 20 the stream across the plate 20 will be of substantially uniform flow rate and have a uniform distribution of slurry particles.

In the embodiment of the invention shown in the drawings each of the plates 20 discharges into a vertical shute 19. It will be appreciated that some of the slurry stream flowing over the terminal ends of plate 12 will fall directly into the shute 19. It will only be in the intermediate portion of the plates 20 in which exactly even distribution of the slurry particles will take place.

This embodiment of the invention was designed for use with preexisting seive bends and for installation in an existing facility. In the more normal situation one or other of the plates 20 would be extended to collect all of the stream flow. This extension of the plate 20 would be sufficiently long to allow the stream between each of the dividing members to spread itself evenly over the plate therebetween.

In an alternative arrangement the shute 19 may discharge onto a further sloping plate on which the increments of discharge from the plates 20 may each spread evenly over a corresponding part of the further plate.

I claim:

1. A device for converting at least a part of a stream of a flowable medium flowing down a tube into a flat stream having a substantially uniform flow rate across its width, comprising:

a substantially vertical tube down and through which the medium can flow;

a stationary and planar first plate, said first plate being substantially flat and substantially horizontal to induce smooth and non-turbulent flow of said medium across said first plate and being disposed below the tube;

at least one second plate inclined at an angle substantially less than 90° relative to the first plate and adapted to receive medium flowing over the edge of at least a portion of the first plate and extending at least partially beneath the first plate and terminating in a straight lower edge; and means to meter the amount of medium flowing onto any one increment of the width of the second plate so that it will be, after flowing down the second plate a predetermined distance, substantially equal to the amount of medium flowing down any other increment of equal width.

2. The device as claimed in claim 1 wherein the means to meter the amount of medium flowing onto the second plate comprises the portion of the first plate over which the stream falls onto the second plate has a shape that lies along a locus defined by the formula:

$$Y = + \text{ and } - \left(\frac{A}{\operatorname{TAN} A}\right) \times \left(\frac{W}{\pi}\right)$$

where $A = (X\pi/W)$ in radians where W = the width of the second plate, where X = the distance along a coordinate orthogonal to the downward direction of flow of the median on the second plate and which has its origin at the point at which the vertical axis of the tube would, if extended, meet the first plate, and where Y = the distance along a coordinate parallel to the downward direction of flow of the medium on the second plate, which coordinate shares a common origin with the x coordinate.

3. The device as claimed in claim 2 wherein the entire edge of the first plate falls along the defined locus.

4. The device as claimed in claim 1 wherein the means to meter the amount of medium flowing onto the second plate comprises a plurality of dividing members positioned on or about the edge of the first plate and extending transversely to the plane of the first plate, the leading edges of the dividing members serving to divide the stream flowing over the edge of the first plate into a number of parts, adjacent dividing members serving to direct the stream flowing between them onto an increment of the second plate of such width that the ratio of the angle subtended between each pair of adjacent dividing members at the origin of the first plate to the width of the increment of the second plate to which the stream flowing between those adjacent dividing members is directed is substantially constant.

5. The device as claimed in claim 4 wherein said dividing members are planar and extend substantially vertically, and the leading edges of said dividing members adjacent said first plate are spaced with respect to each other so that said leading edges subtend an angle of 20° with respect to the axis of said tube.

6. A method for converting at least a part of a stream of a flowable medium flowing down a tube into a flat stream having a substantially uniform flow across its width, comprising the steps of flowing the stream of the flowable medium down a substantially vertical tube onto a substantially horizontal stationary and planar first plate, flowing the flowable medium across said first plate in a non-turbulent manner and over at least a portion of the edge of the first plate onto a second plate inclined at an angle substantially less than 90° relative to the first plate, and metering the flow of the flowable medium over the said portion of the edge of the first plate so that the amount of medium flowing onto any one increment of the width of the second plate will be, after flowing down the second plate a predetermined distance, substantially equal to the amount of medium flowing down any other increment of equal width.

* * * * *